(12) United States Patent
Brewer et al.

(10) Patent No.: US 7,930,730 B2
(45) Date of Patent: Apr. 19, 2011

(54) COMMUNITY NETWORK NAVIGATION

(75) Inventors: Brett David Brewer, Sammamish, WA (US); Gary W. Flake, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1116 days.

(21) Appl. No.: 11/640,698

(22) Filed: Dec. 18, 2006

(65) Prior Publication Data

US 2008/0148156 A1    Jun. 19, 2008

(51) Int. Cl.
G06F 15/16    (2006.01)

(52) U.S. Cl. .................................. 726/3; 726/4

(58) Field of Classification Search .............. 726/2–6, 726/14, 22–25; 713/163, 170; 709/223–225
See application file for complete search history.

(56) References Cited

U.S. PATENT DOCUMENTS

| | | | |
|---|---|---|---|
| 5,768,552 A * | 6/1998 | Jacoby | 345/441 |
| 6,631,412 B1 | 10/2003 | Glasser et al. | |
| 7,672,950 B2 * | 3/2010 | Eckardt et al. | 707/999.01 |
| 2003/0079024 A1 | 4/2003 | Hough et al. | |
| 2004/0162877 A1 | 8/2004 | Van Dok et al. | |
| 2004/0228531 A1 | 11/2004 | Fernandez et al. | |
| 2005/0050143 A1 | 3/2005 | Gusler et al. | |
| 2005/0171799 A1 | 8/2005 | Hull et al. | |
| 2006/0010200 A1 | 1/2006 | Mousseau et al. | |
| 2006/0031361 A1 | 2/2006 | Bailey et al. | |
| 2006/0036703 A1 | 2/2006 | Fulmer et al. | |

OTHER PUBLICATIONS

Roush Wade, "IM-Based Social Networking", Date: May 9, 2006, http://www.morgenthaler.com/content/Ventures/Portfolio%20News/MIT_Technology_Review_5_9_06.pdf#search=%22instant%20messaging%20user%20interface%.
Whittaker, et al., "Interaction and Outeraction: Instant Messaging in Action", Date: Dec. 2-6, 2000, Philadelphia, PA, http://www.darrouzet-nardi.net/bonnie/pdf/Nardi_outeraction.pdf#search=%22instant%20messaging%20buddy%20list%20user%20interface%20for%20social.
"Orkut," printed Sep. 20, 2006, from http://www.orkut.com/About.aspx.

* cited by examiner

*Primary Examiner* — Hosuk Song
(74) *Attorney, Agent, or Firm* — Hope Baldauff Hartman, LLC (57) ABSTRACT

Methods and computer-readable media are provided for navigating a community network environment and viewing various network attributes at various network zoom levels. A user interface is displayed that includes a representation of each community network participant, with each representation including a community network attribute. A request is received to zoom the user interface to view the community network at various zoom levels. In response to the request, the user interface is fluidly zoomed and additional community network attributes are displayed corresponding to each community network participant at each of the zoom levels.

17 Claims, 10 Drawing Sheets

COMMUNITY NETWORK NAVIGATION

BACKGROUND

Community networks provide an easy method of communication for people that may be geographically separated by large distances. Community networks may take many forms, including electronic mail (e-mail) networks, Internet forums and message boards, instant messaging (IM) networks, and chat rooms such as Internet relay chat (IRC). Community networks promote open discussions relating to any number of topics such as politics, religion, professions, education, sports, hobbies, and dating, or just personal person-to-person communication.

E-mail is an extremely popular method of communication among a network of people. However, e-mail is limited in that the communications do not take place in real time. There is a delay, sometimes a substantial delay, between the time an e-mail is sent and the time that it is received by another party. Additionally, a party can only send e-mail to another party whose e-mail address is known. There are no means by which a sending party can browse a large list of unknown e-mail addresses or by which a sending party can visualize and interact with a network of all parties having e-mail capabilities in order to locate the e-mail address for the intended receiving party.

Internet forums allow people to post messages in much the same way as an e-mail is sent. The message, however, is posted to a forum that allows a potentially large community of people to view the message and post replies. Internet forums work well for communicating with a large audience, but when a private conversation with one or a few members of the community is desired, the same limitations discussed above with respect to e-mail apply.

IM networks and chat rooms allow people to communicate in similar ways as e-mail and Internet forums, only in real-time. A person joining an IM network may have a list of contacts, or those people whose IM addresses are known and who have agreed to be a part of the contact list. Subject to some user preference options when setting up a user profile, users that are participating in an IM network are notified as to the online status, or availability, of the contacts in their list. However, the knowledge of the status or other information pertaining to others sharing the IM network is limited to those in the contact list. Chat rooms are subject to similar characteristics and limitations.

It is with respect to these considerations and others that the disclosure made herein is provided.

SUMMARY

Methods and computer-readable media are provided herein for navigating a community network and for providing zoom-dependent views of community network attributes. As described herein, graphical representations of community networks are provided to visually represent each participant in a community network along with varying amounts of associated information, called attributes, according to a requested zoom level of the graphical representation of the community network.

According to aspects presented herein, a user interface is displayed that includes representations of each participant in a community network. Each representation includes a community network attribute. According to various embodiments, the community network attribute may be an online status indicator, a graphical representation of a relationship between participants in the community network, or a public conversation indicator. A request may then be received to zoom the user interface in order to view the community network at multiple zoom levels. In response to receiving such a request, the user interface is zoomed to the requested level. One or more additional community network attributes may also be displayed or removed for each community network participant that is visible within the user interface at each zoom level.

According to additional implementations, a community network graph, including representations of all of the participants in a community network and the relationships between the participants, is displayed. A request may then be received to zoom in to view a portion of the community network graph. In response to receiving such a request, the community network graph is fluidly zoomed in to reveal the requested portion, as well as multiple community network attributes that are displayed within the requested portion of the community network graph.

Each participant may be visually represented as a node within the community network graph, with color coded lines representing a community network attribute connecting participants that are preferred contacts of one another. Further aspects include receiving a request for and displaying a subset of participants in a community network, such as only the participants with which a requesting participant has had a predefined number of prior conversations.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to methods and computer-readable media for navigating a community network and displaying zoom-dependent community network attributes. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Implementations of the disclosure presented herein allow users to fluidly zoom in and out of a community network graph, thereby viewing representations of any number of community network participants, communication relationships between participants, and community network attributes corresponding to the participants and the network, depending on the zoom level of the community network graph. As used herein, community network attributes may be any type of information about the community network, the community network participants, or a combination thereof. Community network attributes will be described in detail below. A zoom level is a level of zoom at which additional community network attributes are displayed in or removed from the community network graph.

According to aspects presented herein, at a lowest level of zoom of a user interface, a graphical representation of an entire community network may be seen, with nodes representing community network participants and connecting lines between participants with having prior or frequent contact. As will be discussed in detail below, multiple community network attributes may be displayed in various ways in order to convey information about a community network participant or about the community network. As a user zooms in on a portion of the community network graph, additional community network attributes conveying additional information can be displayed.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network (LAN) or wide area network (WAN).

In the following detailed description, references are made to the accompanying drawings that form a part hereof, and which are shown by way of illustration specific embodiments or examples. Referring now to the drawings, in which like numerals represent like elements through the several figures, aspects of the disclosure presented herein for navigating a community network and viewing zoom-dependent community network attributes will be described.

Figure 1:
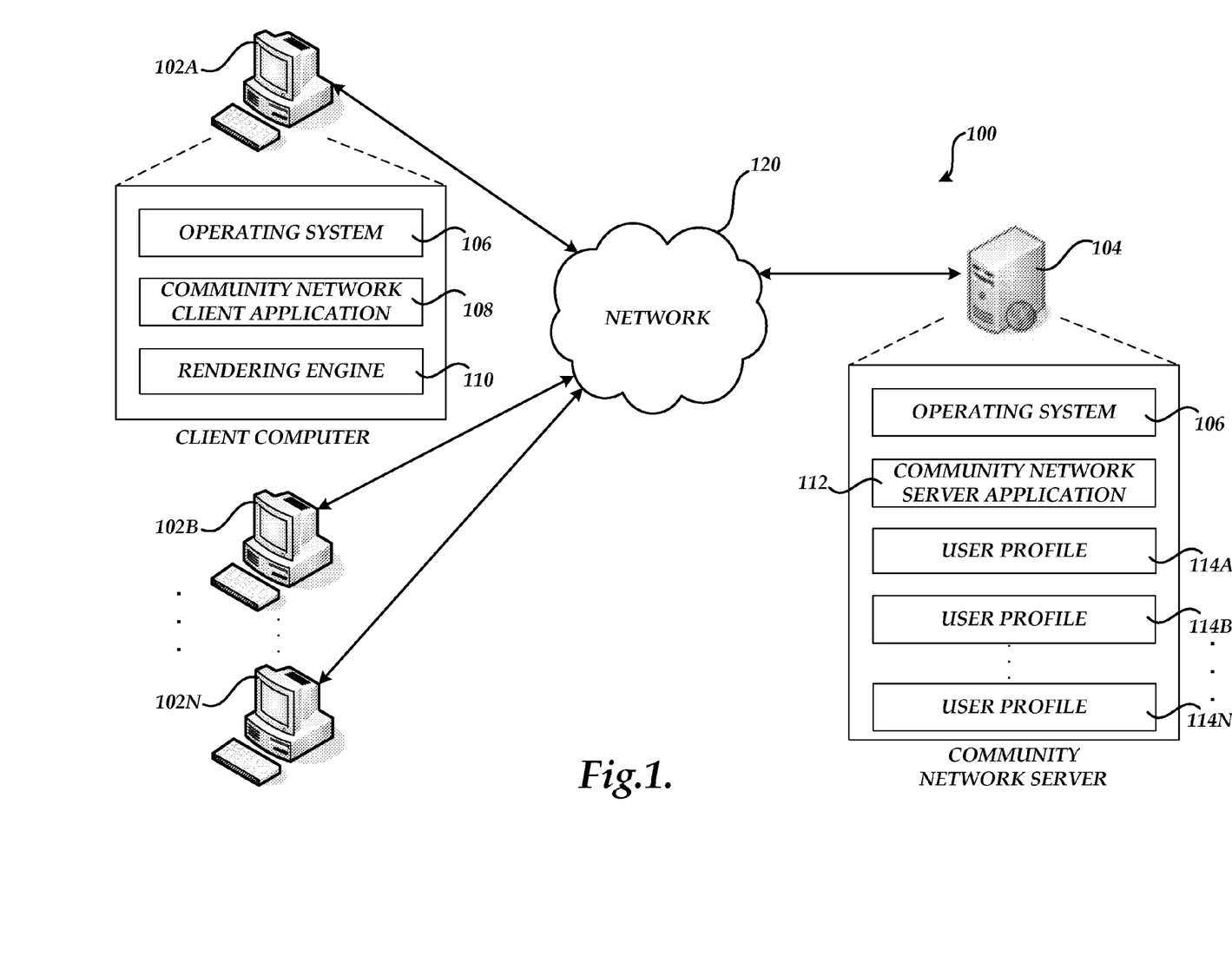
FIG. 1 is a network diagram showing an illustrative operating environment for the processes and computer systems described herein and several of the software and data components utilized by the computer systems described herein.

FIG. 1 is a network diagram shows aspects of an illustrative operative environment 100 for the subject matter presented herein. The operating environment 100 includes client computers 102A-102N, a network 120, and a community network server 104. As shown in FIG. 1, the client computers 102A-102N and the community network server 104 are communicatively coupled to one another through respective connections to the network 120. According to one implementation, the network 120 comprises the Internet. However, it should be appreciated that the network 120 may comprise a LAN, WAN, or other type of suitable network for connecting the client computers 102A-102N and the community network server 104. It should be appreciated that client computers 102A-102N represent any number of client computers used by participants in the community network.

FIG. 1 also illustrates a number of software components utilized by the client computer 102A. It should be understood that each client computer 102A-102N may contain the components discussed below with respect the client computer 102A. According to one implementation, the client computer 102A includes an operating system 106 suitable for controlling the operation of a networked desktop or laptop computer. According to implementations, the client computer 102A may utilize the WINDOWS XP or WINDOWS VISTA operating systems from MICROSOFT CORPORATION of Redmond, Wash. Other operating systems, such as the LINUX operating system or the OSX operating system from APPLE COMPUTER, INC. may also be utilized. It should be appreciated that although the embodiments presented herein are described in the context of desktop or laptop client computers 102A-102N and the community network server 104, many other types of computing devices and systems may be utilized to embody the various aspects presented herein.

According to one implementation, the client computer 102A also includes a community network client application 108. As will be described in detail below, the community network client application 108 receives and displays community network information and enables communications with other community network participants via the client computers 102B-102N and the network 120. It should be understood that the community network client application 108 may be a messaging application such as an e-mail client application program or an IM application program.

The client computer 102A may also include a rendering engine 110 capable of rendering hypertext markup language (HTML) pages and other types of data into a visual representation on a display of the client computer 102A. Applications on the client computer 102A such as a Web browser and the community network client application 108 may utilize the rendering engine 110 to render pages and other data received from the client computers 102B-102N and the community network server 104 via the network 120. In this manner, the rendering engine 110 may be utilized to provide a visual representation of community network data. It should also be understood that the rendering engine 110 may be a component of the community network client application 108, may be a component of the operating system 106, or may be a separate component altogether.

According to implementations presented herein, the rendering engine 110 is operative to provide functionality for fluidly zooming into and out of a community network graph or user interface. This continuous, fluid zooming capability contrasts the discrete zooming capabilities of traditional application programs. In existing applications, the transition between document views having different resolutions is not fluid in that the existing view is erased, followed by a rendering of the document at the requested resolution, resulting in a hesitation as the view transitions.

In contrast, the disclosure presented herein utilizes algorithms that allow for fluid and continuous transitions between zoom levels by extrapolating between stored community network graph resolutions to arrive at the requested graph resolution in a fluid, continuous manner. The amount of data transferred to the rendering engine from the requested graph resolution is proportional to the resolution of the display screen on which the document is to be rendered and includes the differences between the existing document resolution and the requested document resolution. This process is described in U.S. Pat. No. 7,075,535, filed Mar. 1, 2004 and entitled "System and Method for Exact Rendering in a Zooming User Interface," which is assigned to the assignee of the instant patent application and incorporated by reference herein in its entirety.

According to aspects presented herein, the community network server 104 includes an operating system 106 and a community network server application 112. As will be described below, the community network server application 112 monitors the community network and updates information within the user profiles 114A-114N stored within the community network server 104 or externally in a database or additional server computer. The user profiles 114A-114N contain information corresponding to each community network participant using the client computers 102A-102N.

The user profiles 1114A-114N may also contain information related to the status of any communications initiated or engaged in by a community network participant. For example, when a community network participant logs into the community network, the community network client application 108 residing on the client computer 102A sends a notification to the community network server 104 that the associated community network participant is online. Alternatively, the community network client application 108 may send a login request to the community network server application 112 or other authentication server, which authenticates a participant's qualifications for communicating with others via the community network. Once authenticated, the community network server 104, and specifically the community network server application 112, stores the participant's login status within the appropriate user profile 114.

Figure 2:
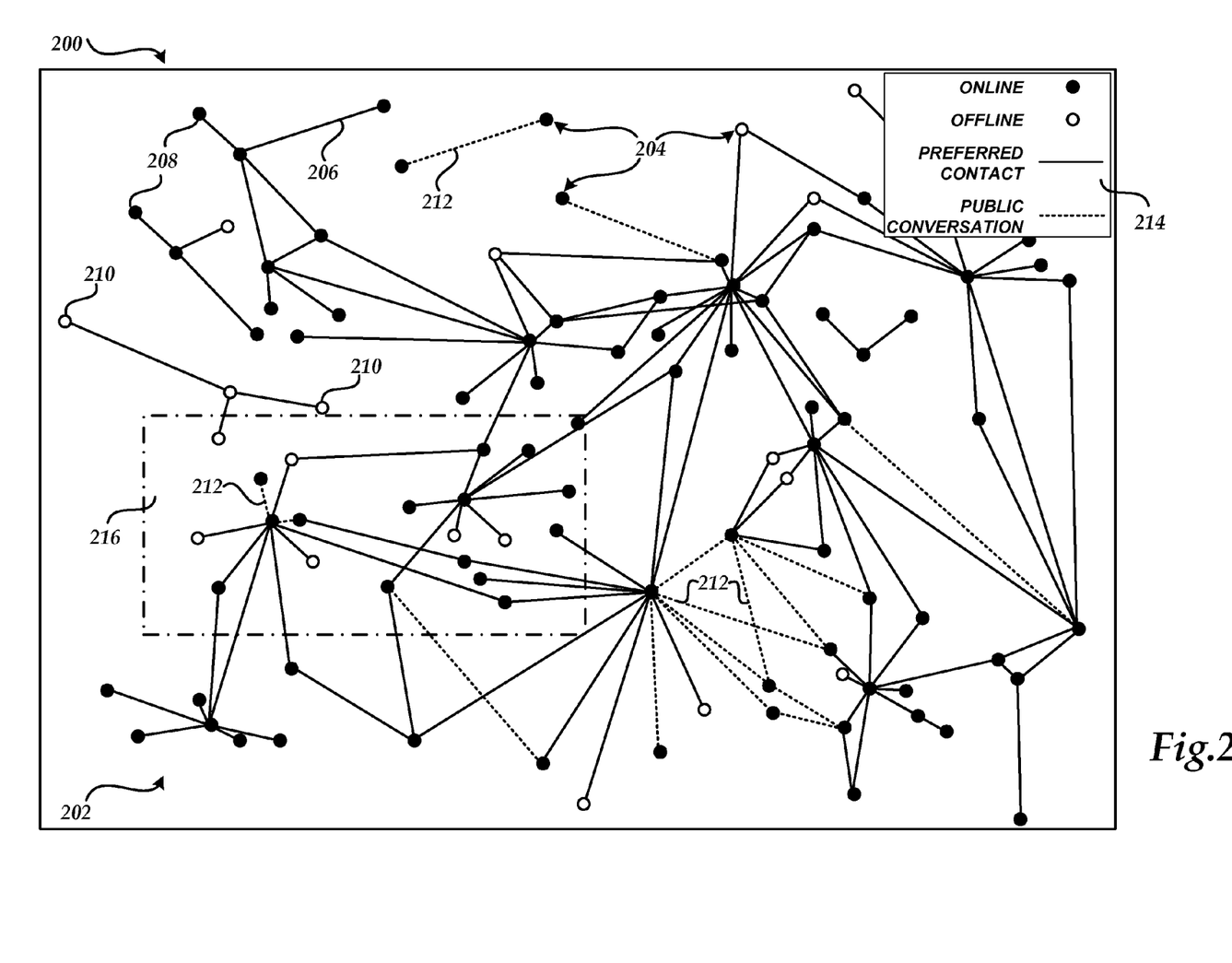
FIG. 2 is a user interface diagram showing an illustrative community network graph depicting participants in a community network and corresponding community network attributes according to one embodiment presented herein.

Turning now to FIG. 2, a user interface 200 will be described that is provided by the community network client application 108. As shown in FIG. 2, the user interface 200 includes a graphical representation of a community network 202. For illustrative purposes, the community network 202 shown in FIGS. 2-4 will be described as being an IM community network, but it should be understood that the disclosure presented herein is not limited to an IM community network and may be applied to any type of community network.

In the embodiment shown in FIG. 2, each participant in the community network 202 is represented by a node 204. It should be understood that a participant in the community network 202 may be defined as either a user that has registered with the community network 202 as a participant, as a user that has registered and has previously engaged in one or more conversations via the community network 202, or a user that has registered with the community network 202 and is currently engaged in a conversation. Registration is a process whereby a user provides information about herself, including a chosen screen name and any preferences that she may have. This information may be stored in one of the user profiles 114A-114N.

Looking at the legend 214 of the user interface 200 according to one implementation, the solid nodes 208 represent community network participants that are currently online. In contrast, the open nodes 210 represent community network participants that are currently offline. The solid connection lines 206 between nodes 204 may represent the connected community network participants as being preferred contacts of one another. In one implementation, being a preferred contact means that the two community network participants have communicated at least one time in the past, or that they have communicated any predefined number of times. Alternatively, the solid connection lines 206 may represent current private conversations between the participants represented by the connected nodes 204, without regard to preferred contacts. The dotted connection lines 212 between nodes 204 represent public conversations that are currently taking place between the associated community network participants. Public and private conversations will be discussed in greater detail below with respect to FIG. 4.

It should be appreciated that the nodes 204 and the connection lines 206 and 212 may be used to identify any desired attribute of the community network 202 and the corresponding community network participants. It should also be appreciated that any types of representations may be used with respect to the nodes 204 and connection lines 206 and 212, including but not limited to color coding, patterns, shapes, text, and animation such as flashing lines and nodes. For example, blue connection lines 206 and 212 between nodes 204 may represent community network participants that have communicated in the past, while red connection lines 206 and 212 may indicate that the associated community network participants have not communicated previously.

As will be described in greater detail below, the user interface 200 may be zoomed in to view additional community network attributes. As an example, the community network attributes shown at the lower zoom levels (a higher magnification of the graph 202) may indicate geographical information. Green nodes 204 may indicate that the corresponding community network participants live in the United States, while orange nodes 204 represent community network participants that reside in Europe. Further, flashing connection lines 206 and 212 may indicate conversations that have just been initiated, while flashing nodes 204 may represent community network participants that have files that they are willing to share with the community network 202. It should be appreciated that any combination of node and connection line characteristics may be used to represent community network attributes at the lower zoom levels where there are many nodes 204 to display and corresponding connection lines 206 and 212, and consequently not much available space within the user interface 200 for additional community network attributes.

Using the scale-free zooming capabilities of the rendering engine 110, a community network 202 comprising a large number of participants may be represented in the manner shown in FIG. 2. By allowing for the fluid zooming out of the user interface 200, an almost infinite number, limited only by processing and display capabilities, of nodes 204 may be exposed on the user interface 200. This capability, coupled with the capability to provide an increased number of community network attributes when zooming into the user interface 200 through multiple levels of zoom, allows a community network participant to view information about other participants in the community network 202 with whom he has not had any previous contact with and then to communicate with those community network participants. From the user interface 200, a community network participant may zoom into the community network 202 in order to gather additional data, or attributes, with regard to community network participants and ongoing conversations between participants. Maintaining the illustrative example, a community network participant using the user interface 200 may zoom into the community network 202 to view the zoomed-in area 216, identified in FIG. 2 by a portion of the community network graph outlined with a dotted line. It should be appreciated that a user input device, such as a computer keyboard or mouse, may be used to control the zooming action. For example, the community network participant may utilize a scroll wheel on a computer mouse to instruct the community network client application 108 or the community network server application 112 to zoom into the user interface 200.

Figure 3:
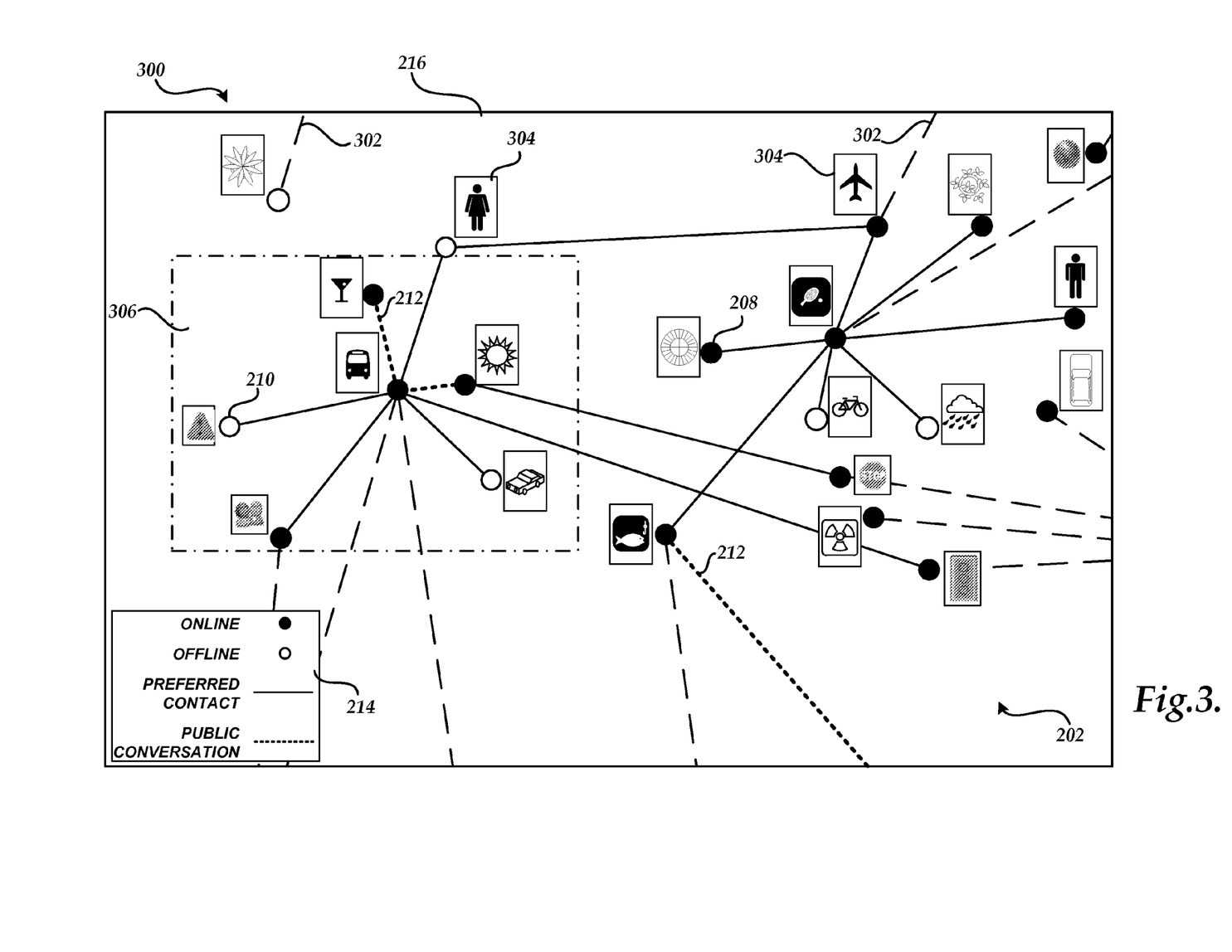
FIG. 3 is a user interface diagram showing a zoomed-in portion of the illustrative community network graph of FIG. 2 depicting participants in the community network and additional community network attributes according to one embodiment presented herein.

FIG. 3 shows the user interface 200 that is displayed in response to receiving the request for the zooming action. In particular, in response to the request described above with respect to FIG. 2, the community network graph 202 is fluidly zoomed in until the user interface 300 is filled with the zoomed-in area 216. The zoomed-in area 216 may include the dotted lines 302 that are connection lines leading to community network participants that are outside of the user interface 300 due to the zooming action. It should be appreciated that these connection lines may remain solid, be represented using another color, or may be omitted from the user interface 300 altogether.

When the community network graph is zoomed in to the higher zoom level shown in FIG. 3 from the lower zoom level shown in FIG. 2, the community network client application 108, using data received from the community network server application 112, displays additional community network attributes in comparison to the minimal community network attributes shown at lower levels of zoom. The additional community network attributes shown in the user interface 300 include avatars 304 corresponding to the nodes 204 that represent the community network participants. Each community network participant may enter an avatar 304 into the corresponding user profile 114A-114N when registering for participation in the community network or at any time a change is desired. The avatars 304 create a visual identity for each community network participant. The avatars 304 may include photographs, symbols, icons, text, or any other indicia that may be used to represent a community network participant.

It should be understood that the additional community network attributes that are displayed at the higher zoom level shown in FIG. 3, and at any subsequent or previous zoom level, are not limited to the avatars 304. Rather, any F number and type of additional community network attributes may be displayed at each zoom level. For example, instead of or in addition to the avatars 304, other community network participant identifiers may be displayed. An example would include a screen name associated with the community network participant along with the corresponding avatar 304.

As stated above, a zoom level is a level of zoom at which additional community network attributes are displayed in or removed from the user interface depicting a graphical representation of the community network 202. As discussed above, the rendering engine 110 provides for fluid, scale-free zooming into and out of a graphical representation of the community network 202. As a user zooms from a lower zoom level in which all or a majority of the community network participants are represented within the user interface to a higher zoom level in which fewer community network participants are represented, or from a higher zoom level to a lower zoom level, various zoom levels, or zoom thresholds will be reached and crossed. As a new zoom level is reached, community network attributes will be added or removed from the user interface depicting the community network 202 depending on the direction of zoom.

A zoom level and the corresponding community network attributes to display at each zoom level may be predefined within the community network client application 108 or the community network server application 112. Alternatively, community network attributes may be selected for display by the community network client application 108 or the community network server application 112 as each zoom level is reached according to the number of available community network attributes corresponding to the nodes 204 visible in the user interface at that zoom level, and according to the amount of space available within the user interface as determined by the number of visible nodes 204 and amount of corresponding community network attributes.

It should be appreciated from the above discussion that the implementations described herein are not limited by the amount and type of community network attributes displayed at each zoom level. As a community network participant or other user zooms in and out of a graphical representation of the community network 202, she is able to control the amount and type of data viewed for each community network participant of the entire community network 202. Consequently, the user is able to choose any community network participant or group of participants with which to initiate or join a conversation.

Figure 4:
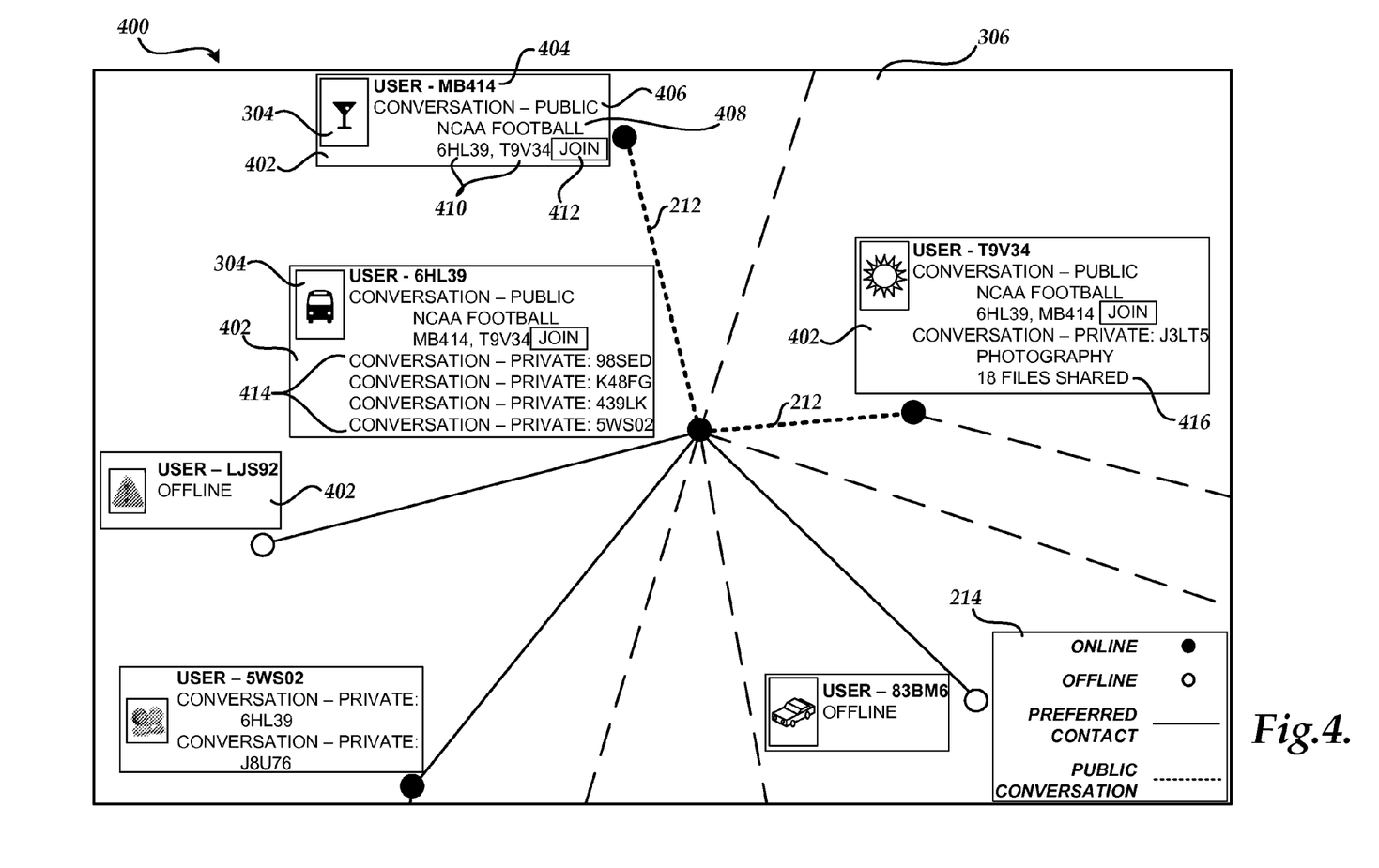
FIG. 4 is a user interface diagram showing a zoomed-in portion of the illustrative community network graph of FIG. 3 depicting participants in the community network and additional community network attributes according to one embodiment presented herein.

Returning to the illustrative example, a community network participant may request to further zoom into the community network 202 using the user interface 300 to view the zoomed-in area 306. As stated above, the community network participant may use a user input device, such as a computer keyboard or mouse, to control the zooming action. Referring now to FIG. 4, the user interface 400 displayed in response to receiving the zooming request from the community network participant will be described. In particular, the community network graph 202 is fluidly zoomed in until the user interface 400 is filled with the zoomed-in area 306 in the manner shown in FIG. 4.

At this higher zoom level, community network attribute windows 402 are displayed. Within the community network attribute windows 402, additional community network attributes are displayed. For instance, in the community network attribute window 402 associated with a user MB414, the additional community network attributes 404, 406, 408, 410, and 412 can be seen. The additional community network attribute 404 corresponds to a user name associated with the community network participant, MB414 in this example. The additional community network attribute 406 indicates whether a conversation in which the community network participant is engaged is a public conversation or a private conversation.

A private conversation is a conversation or communication link between two or more community network participants that is not available to others to join. In contrast, a public conversation is a conversation or forum that may be open to all community network participants that wish to join. Alternatively, the community network participant initiating a public conversation may choose to open the conversation to only a select group or subset of the community network 202. As will be discussed in greater detail below, if a community network participant attempts to join a public conversation, the community network client application 108 or the community network server application 112 will determine if any restrictions were placed on the public conversation and authenticate the authority of the user to join the conversation.

The additional community network attribute 408 describes a subject or topic of the public conversation. In this example, the public conversation is about NCAA football. In the context of an IM network, a public conversation becomes a real-time conversation about any number of topics. A user may use a low zoom level to identify, through community network attributes corresponding to a node 204 or connection line 206 or 212, the conversations that are public conversations. Then, the community network participant may zoom in to one or more of those public conversations to expose the additional community network attribute 408 corresponding to each of those public conversations to determine if the topic is one that the community network participant is interested in joining. Once a public conversation of interest is found, the community network participant may request to join that conversation.

Alternatively, as will be discussed below, a community network participant may request a user interface that depicts a graphical representation of a subset of the community network 202. The subset may include only public conversations. The resulting display of the subset of the community network 202 becomes a network of messaging forums, allowing for real-time discussions between any number of community network participants across the community network 202.

The additional community network attribute 410 identifies the other community network participants with which the user identified as MB414 is conversing. When a conversation is public, the community network attribute window 402 may include a selectable option 412 for joining the public conversation. Alternatively, the connection line 212, which in this example designates a public conversation using a dotted line, may be selected via the user interface 400 by a community network participant to request joining the conversation.

Looking at the community network attribute window 402 corresponding to the user identified as 6HL39, it can be seen that this community network participant is not only engaged in the public conversation with users identified as MB414 and T9V34 about NCAA football, but is also engaged in multiple private conversations as indicated by the additional community network attributes 414. It should be understood that when registering with the community network 202 and establishing a user profile 114A, a community network participant may choose to limit the information available for display within a community network attribute window 402. In this manner, a community network participant may decide that she should only be represented as a node 204 on a graphical representation of the community network 202, that she may be represented by an avatar 304 at the appropriate zoom level, that her conversation status should or should not be displayed, that all available community network attributes may be displayed, or any combination thereof.

The community network attribute window 402 corresponding to a user identified as LJS92 shows that the associated community network participant is currently offline, and therefore not available for communications. The community network attribute window 402 corresponding to the user T9V34 shows that the associated community network participant is not only a participant in the public football discussion, but is also engaged in a private conversation with a user identified as J3LT5 regarding photography. The additional community network attribute 416 further shows that 18 files have been shared during the conversation. This file sharing information, when displayed with respect to public conversation may induce a community network participant to join or request to join the conversation.

Additionally, it should be understood that even if the conversation is a private conversation, a community network participant may request to join that conversation. This request may be transmitted to one or more of the community network participants that are engaged in the private conversation, rather than being authenticated by the client computer 102A or the community network server 104 according to the criteria for joining a conversation as established by the community network participant when initiating the conversation or according to the user profile 114A of the community network participant that initiated the conversation. This request may then be accepted or denied by the parties to the private conversation.

Figure 5A:
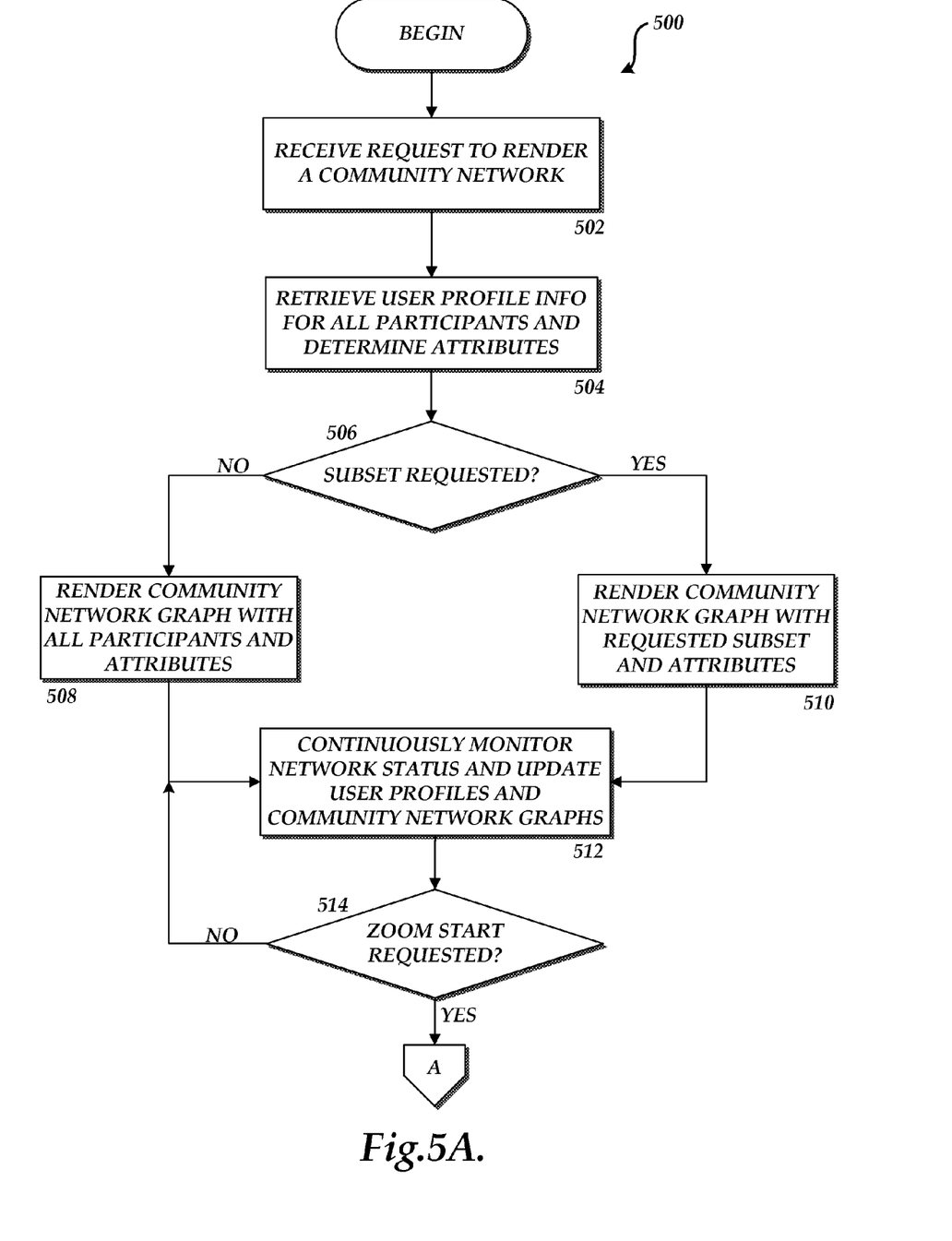
FIGS. 5A and 5B are flow diagrams illustrating one method for navigating a community network according to one embodiment presented herein.
Figure 5B:
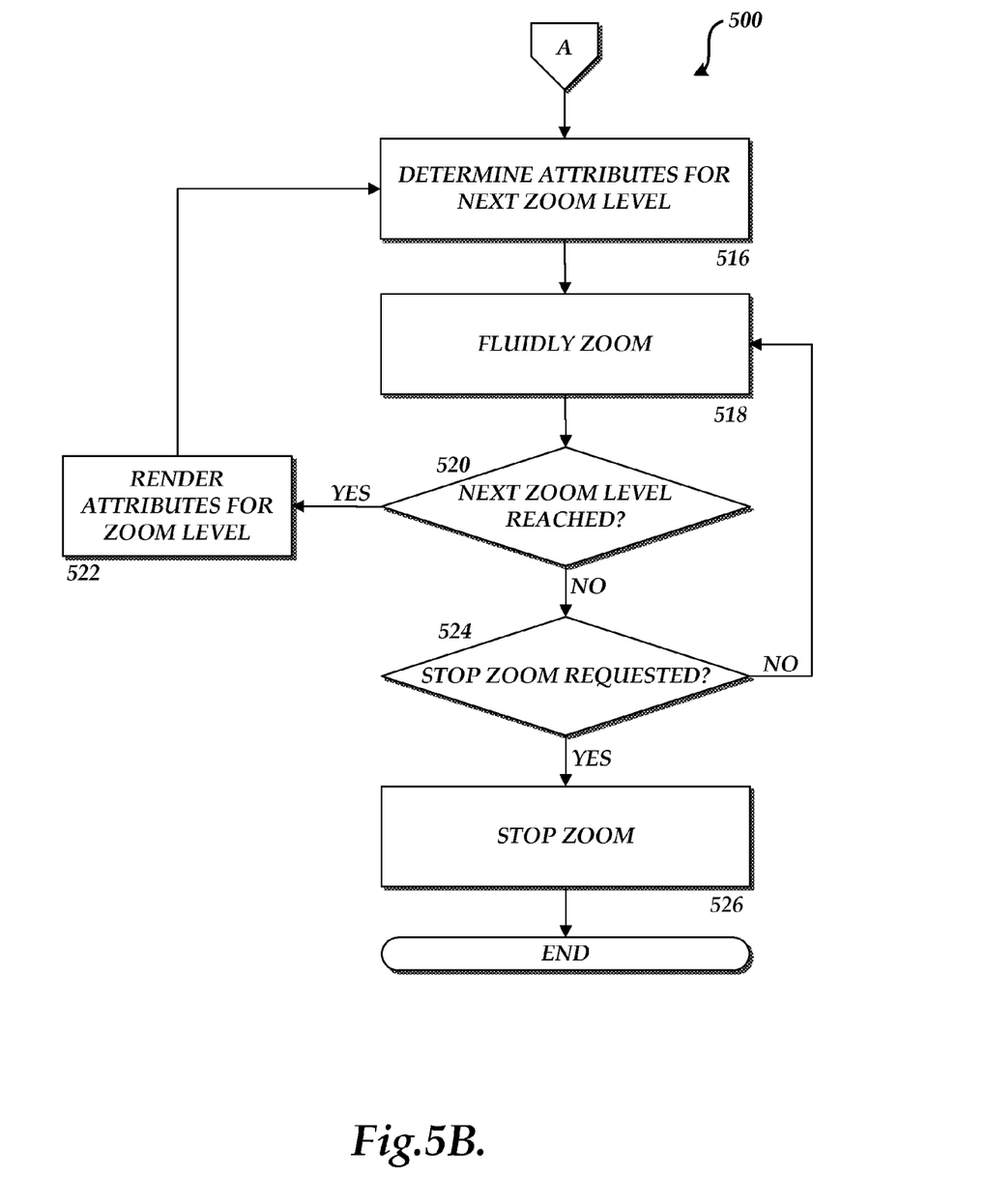

Referring now to FIGS. 5A and 5B, an illustrative routine 500 will be described for navigating a community network 202 according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 500 begins at operation 502, where the community network server application 112 receives a request from the community network client application 108 to render a representation of the community network 202. From operation 502, the routine 500 continues to operation 504, where the community network server application 112 retrieves information from the user profiles 114A-114N corresponding to all community network participants. Using this information, the community network server application 112 determines the relationships and corresponding community network attributes associated with all of the community network participants. The routine 500 proceeds from operation 504 to operation 506, where the community network server application 112 determines whether a subset of the community network 202 has been requested.

A request for a subset of the community network 202 may be any requested partitioning of the community network 202 according to any community network attributes or combination of community network attributes. For example, a community network participant may request to view a graphical representation of the community network 202 that only includes nodes 204 corresponding to community network participants with which she has had previous contact. Doing so greatly reduces the number of nodes 204 and corresponding community network attributes with which the requesting community network participant is unlikely to have an interest in. Similarly, the community network participant may request to view subsets according to public conversations, public conversation topics, active conversations, geographic location of the community network participants, recent conversations, online community network participants, public file sharing conversations, or any other community network attributes that may be used to sort the community network participants.

If it is determined at operation 506 that a subset of the community network 202 has not been requested, then the routine 500 proceeds to operation 508, where the community network client application 108, using the community network attributes from the community network server application 112, renders a community network graph representing all community network participants and corresponding community network attributes depending on the zoom level. However, if at operation 506, it is determined that a subset of the community network graph 202 has been requested, the routine 500 proceeds to operation 510, where the community network client application 108 renders a community network graph representing the requested subset of community network participants and corresponding community network attributes depending on the zoom level.

It should be understood that operations 506, 508, and 510 may be performed by the community network client application 108 or the community network server application 112. The community network server application 112 may provide community network attributes and all other information pertaining to the entire community network 202 to the community network client application 108, which then performs any parsing or partitioning of the data prior to rendering a graphical representation of the requested community network 202 or requested subset of the community network 202 for the requesting community network participant.

Alternatively, all requests from a community network participant using the client computer 102A may be forwarded to the community network server application 112, which then creates the graphical representations of the requested community network 202 or requested subset of the community network 202 for the requesting community network participant and transmits the created graphical representations back to the community network client application 108 for display. Therefore, it should be appreciated that throughout the routine 500, the operations associated with either the community network client application 108 or the community network server application 112 may be performed by either application depending on the desired configuration of the applications and the capabilities and limitations of the client computers 102A-102N, the community network server 104, and the network 120.

From operations 508 and 510, the routine 500 continues to operation 512, where the community network server application 112 continuously monitors the status of the community network 202 and updates the user profiles 114A-114N and the corresponding community network graph rendered at operations 508 or 510. As community network participants come online or drop offline, this status change is reflected in the appropriate user profiles 114A-114N and community network graph. The same process applies to any other change in a community network attribute that may be tracked and displayed.

The routine 500 proceeds from operation 512 to operation 514, where the community network server application 112 determines whether a request to begin zooming into or out of a graphical representation of the community network 202 has been received. If it is determined that a request for zooming has not been received, then the routine 500 returns to operation 512 and proceeds as described above. However, if it is determined at operation 514 that a zoom start request has been received, then the routine 500 proceeds to operation 516, where the community network server application 112 determines the community network attributes to be displayed or removed at the next zoom level.

From operation 516, the routine 500 continues to operation 518, where the community network server application 112 then fluidly zooms in or out of the graphical representation of the community network 202 according to input provided by the community network participant. The routine 500 continues from operation 518 to operation 520, where the community network server application 112 determines whether the next zoom level has been reached. If the next zoom level has been reached, then the routine 500 proceeds to operation 522, where the community network server application 112 renders the community network attributes for the zoom level that were determined at operation 516.

After displaying the community network attributes, the routine 500 returns to operation 516, where the community network server application 112 determines the community network attributes for the next sequential zoom level and the routine continues as described above. However, if at operation 520, it is determined that the next zoom level has not been reached, then the routine 500 continues to operation 524, where the community network server application 112 determines if a request has been received to stop the zooming action. If a request to stop zooming has not been received, then the routine 500 returns to operation 518 and continues as described above. However, if it is determined at operation 524 that a request to stop zooming has been received, then the community network server application 112 stops the zooming action at operation 526 and the routine 500 ends.

Figure 6A:
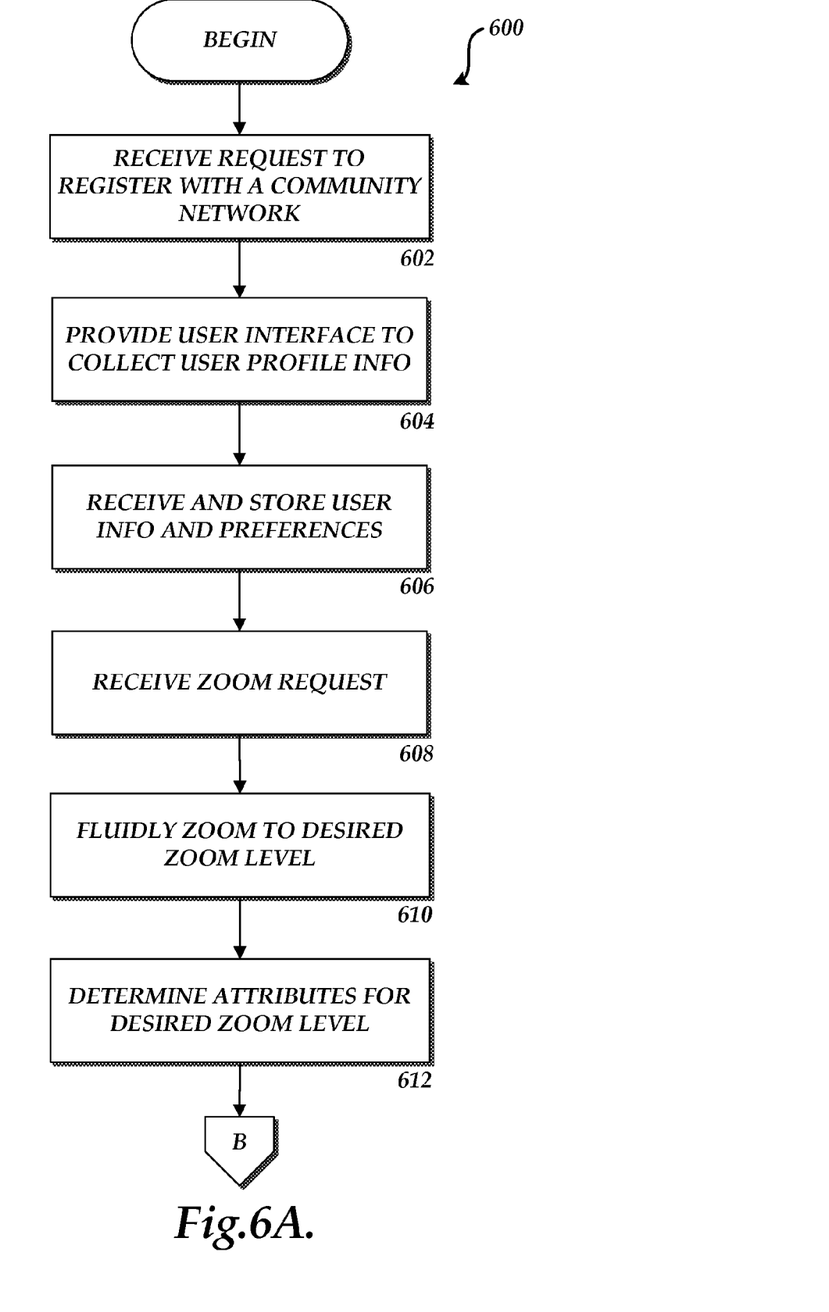
FIGS. 6A-6C are flow diagrams illustrating one method for communicating with other participants in a community network according to one embodiment presented herein.
Figure 6B:
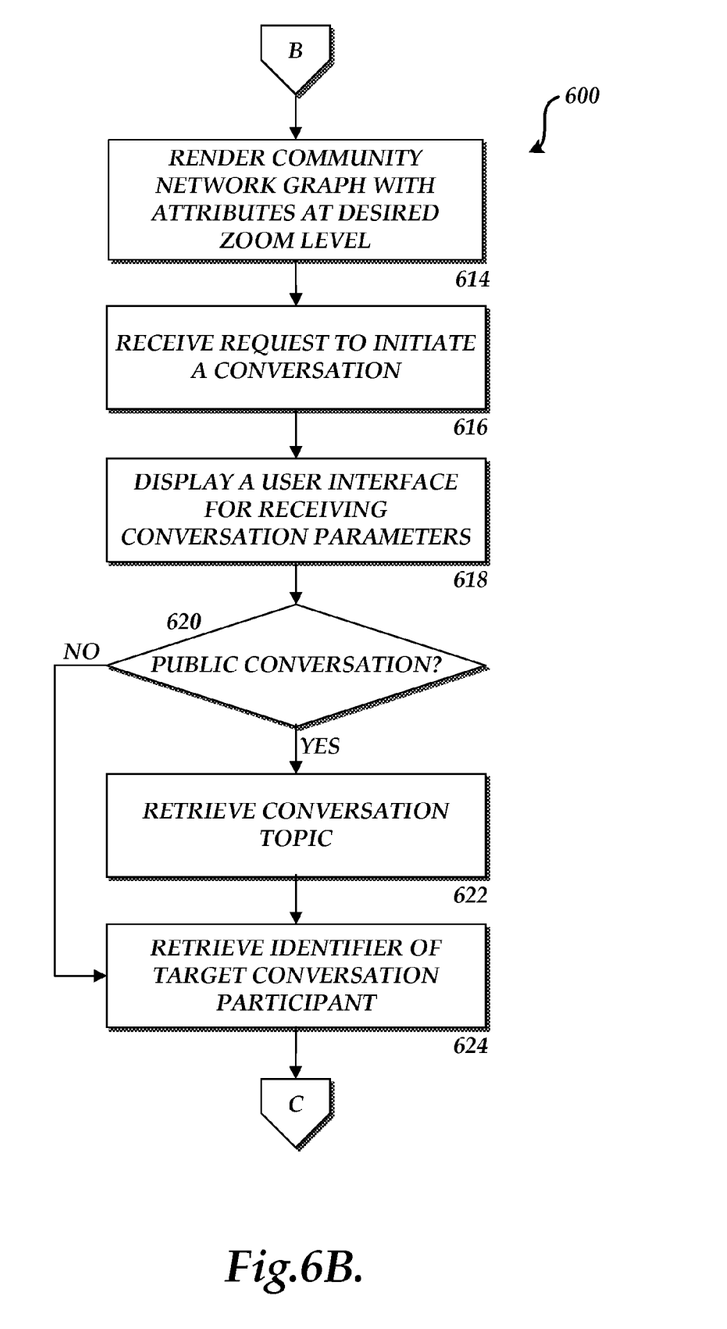
Figure 6C:
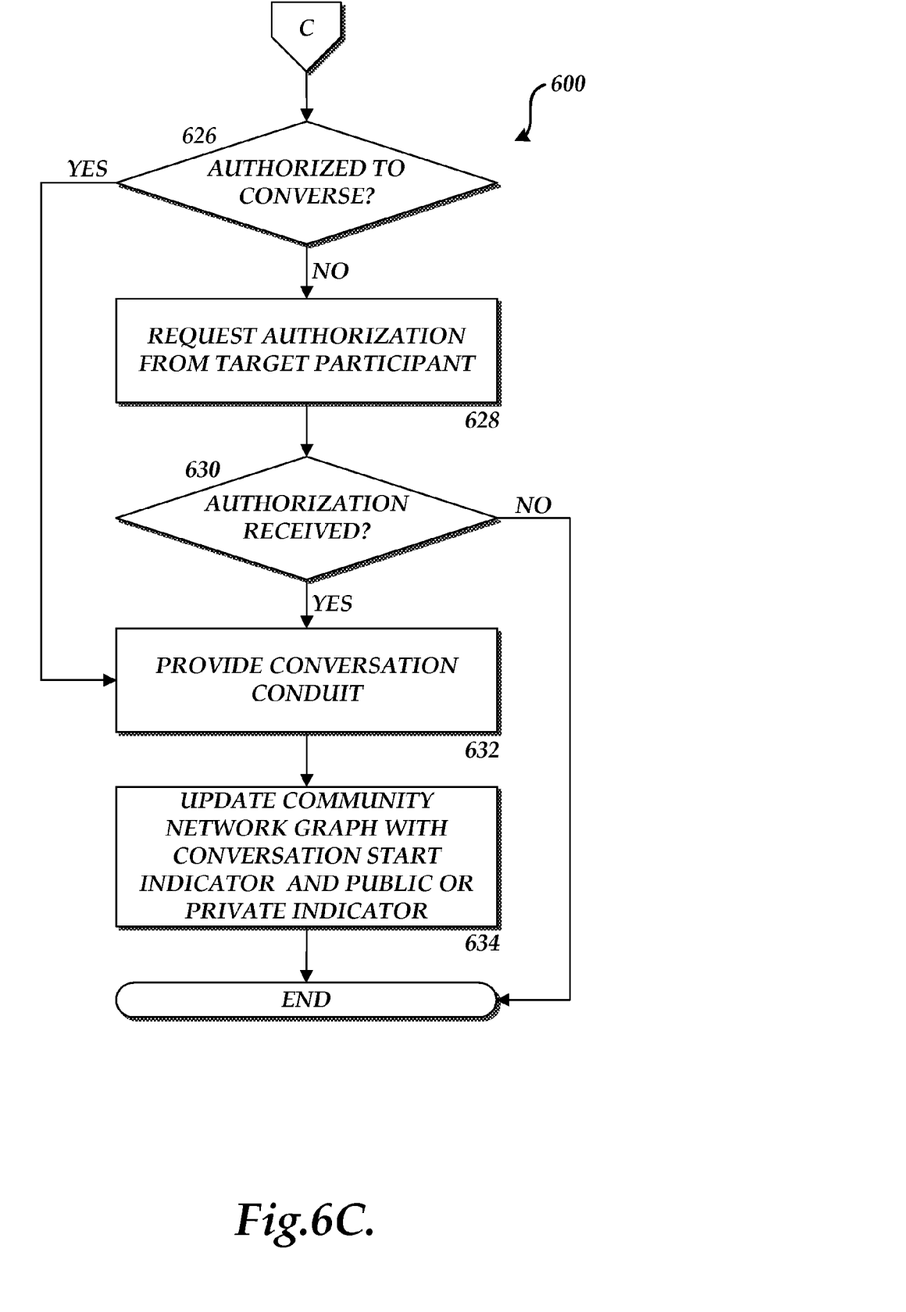

Turning to FIGS. 6A-6C, a routine 600 for communicating with other participants in a community network according to one implementation will be described. The routine 600 begins at operation 602, where the community network server application 112 receives a request to register with the community network 202. At operation 604, the community network client application 108 provides a user interface for collecting information from the user for transmission to the community network server application 112. From operation 604, the routine 600 continues to operation 606, where the community network server application 112 receives the user information and preferences entered into the user interface and transmitted by the community network client application 108, and stores this information in a corresponding user profile 114A.

The routine 600 continues from operation 606 to operation 608, where the community network server application 112 receives a zoom request. In response to receiving the request, the community network server application 112, at operation 610, fluidly zooms to the desired zoom level as described above. From operation 610, the routine 600 continues to operation 612, where the community network server application 112 determines the community network attributes for the desired zoom level. From operation 612, the routine 600 proceeds to operation 614, where the community network server application 112 renders a community network graph with the determined community network attributes for the desired zoom level.

From operation 614, the routine 600 proceeds to operation 616, where the community network server application 112, via the community network client application 108, receives a request to initiate a conversation with another community network participant. From operation 616, the routine 600 continues to operation 618, where the community network server application 112 provides a user interface for receiving conversation parameters. The conversation parameters may include, but are not limited to, a choice to make the conversation private or public, a choice of targeted community network participants, and a topic description.

From operation 618, the routine 600 continues to operation 620, where the community network server application 112 determines whether one of the conversation parameters includes a request to make the conversation public. If it is determined that there is a request to make the conversation public, then the routine 600 continues to operation 622, where a conversation topic is retrieved from the conversation parameters before continuing to operation 624. However, if at operation 620, it is determined that there is not a request to make the conversation public, then the routine 600 proceeds to operation 624, where the community network server application 112 retrieves from the conversation parameters the identifications of the target conversation participants.

From operation 624, the routine 600 proceeds to operation 626, where the community network server application 112 determines whether the user is authorized to enter a conversation with the target community network participants. It may be that the target community network participants have established a preference in their user profiles 114A-114N that effectively blocks the user. Moreover, the target community network participants may be engaged in a conversation for which the user has requested to join, however, the target community network participants have designated a select group of community network participants that may join the conversation and the user is not a part of that designated group.

If the community network server application 112 determines at operation 626 that the user is authorized to communicate with the target community network participants, then the routine 600 proceeds to operation 632 and continues as described below. However, if at operation 626, the community network server application 112 determines that the user is not authorized to communicate with the target community network participants, then the routine 600 continues to operation 628, where the community network server application 112 requests authorization from the target community network participants. At operation 630, the community network server application 112 determines whether authorization was received from the target community network participants.

If authorization was not received at operation 630, then the routine 600 ends. If authorization was received from the target community network participants at operation 630, then the routine 600 continues to operation 632, where the community network server application 112 provides a conduit for the conversation. In doing so, the community network server application 112 may receive and transmit all communications between the parties such that the community network server application 112 acts as an intermediary.

Alternatively, the community network server application 112 may establish a peer-to-peer network between the community network participants for direct communications. From operation 632, the routine 600 continues to operation 634, where the community network server application 112 updates the community network graph with an indication of the start of a conversation and an indication as to whether the conversation is public or private and then the routine 600 ends.

Figure 7:
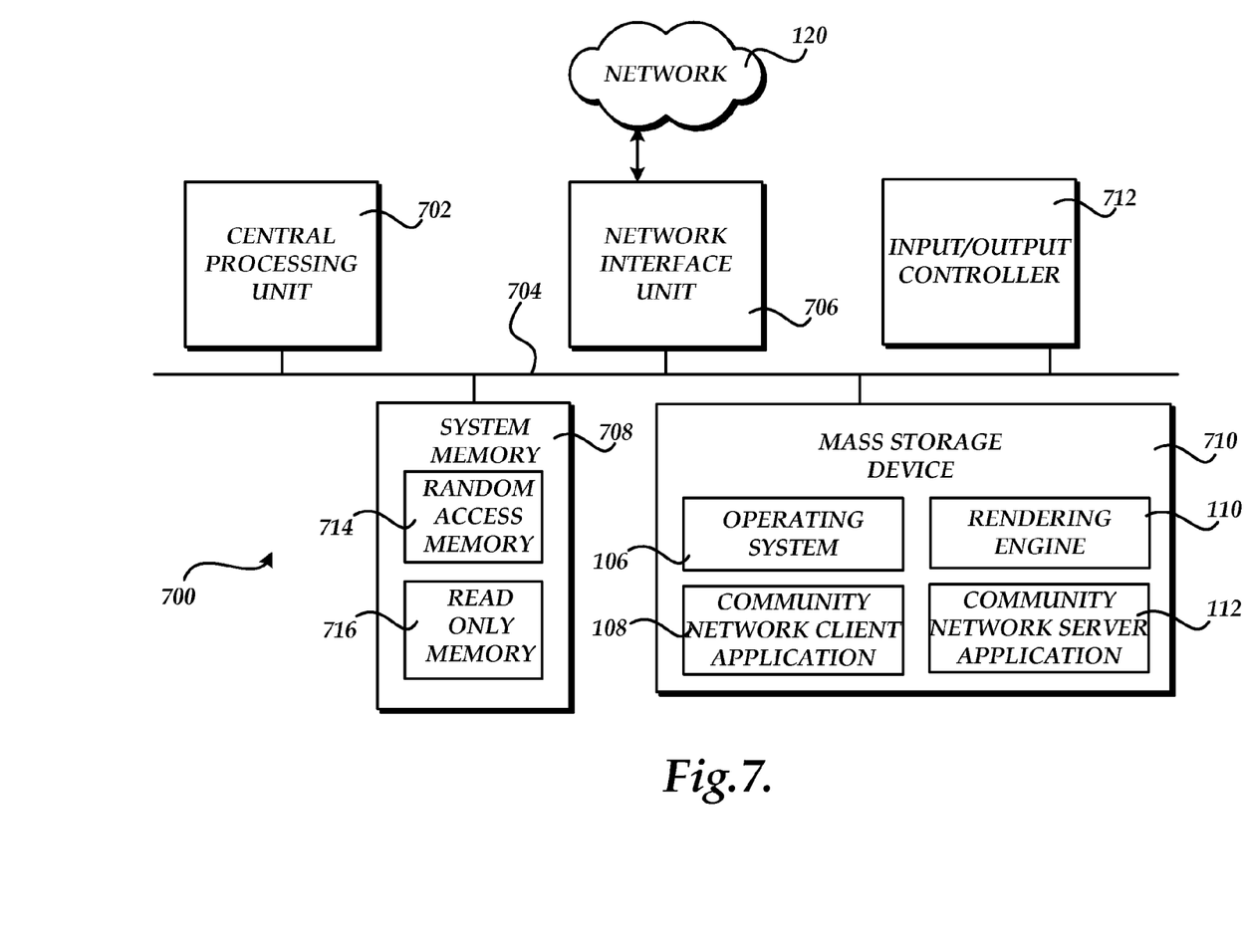
FIG. 7 is a computer architecture diagram showing a computer architecture suitable for implementing the various computer systems described herein.

Referring now to FIG. 7, an illustrative computer architecture for a computer 700 utilized in the various embodiments presented herein will be discussed. The computer architecture shown in FIG. 7 illustrates a conventional desktop, laptop computer, or server computer. The computer architecture shown in FIG. 7 includes a central processing unit 702 (CPU), a system memory 708, including a random access memory 714 (RAM) and a read-only memory (ROM) 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 106 and other program modules, which will be described in greater detail below.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network 120, such as the Internet. The computer 700 may connect to the network 120 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 106 suitable for controlling the operation of a networked desktop or server computer, such as the WINDOWS XP operating system from MICROSOFT CORPORATION of Redmond, Wash., or the WINDOWS VISTA operating system, also from MICROSOFT CORPORATION. The mass storage device 710 and RAM 714 may also store one or more program modules. In particular, the mass storage device 710 and the RAM 714 may store a rendering engine 110, a community network client application 108, a community network server application 112, and the other program modules described above with respect to FIG. 1. Other program modules may also be stored in the mass storage device 710 and utilized by the computer 700.

Based on the foregoing, it should be appreciated that systems, methods, and computer-readable media for navigating a community network and displaying zoom-dependent community network attributes are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for implementing a user interface for browsing a community network, the computer-implemented method comprising computer-implemented operations for:
displaying the user interface including a representation of each of a plurality of community network participants, each representation comprising a community network attribute;
receiving a request to zoom the user interface to view the community network at a plurality of zoom levels; and
in response to the request, displaying one or more additional community network attributes corresponding to each community network participant visible at each of the plurality of zoom levels, wherein the additional community network attributes corresponding to each community network participant visible at each of the plurality of zoom levels comprise an indication that a conversation between a plurality of community network participants is public or private.

2. The method of claim 1, wherein the community network attribute comprises an online status indicator and a graphical representation of a relationship between at least two community network participants.

3. The method of claim 1, wherein the community network attribute comprises a public conversation indicator.

4. The method of claim 1, wherein the one or more additional community network attributes corresponding to each community network participant visible at each of the plurality of zoom levels comprises an avatar.

5. The method of claim 1, further comprising dynamically updating the representation of one or more community network attributes in real-time as the one or more community network attributes change.

6. A computer-implemented method for enabling traversal of a community network, the computer-implemented method comprising computer-implemented operations for:
displaying a community network graph that includes representations of all of the participants in the community network and relationships between participants;
receiving a request to zoom in to view a portion of the community network graph; and
in response to receiving the request, fluidly zooming into the requested portion of the community network graph and displaying a plurality of community network attributes corresponding to each community network participant shown in the requested portion of the community network graph, wherein the plurality of community network attributes displayed in response to zooming in comprises an indication as to whether each conversation is public or private and an identification of other participants with which each participant is engaged in conversation.

7. The method of claim 6, wherein displaying the community network graph comprises displaying each participant as a node on the community network graph with lines connecting participants that are preferred contacts of one another.

8. The method of claim 7, wherein each node and each connecting line are color coded to represent a community network attribute.

9. The method of claim 6, wherein one community network attribute of the plurality of community network attributes displayed in response to zooming in comprises an indication that files are being shared between a plurality of participants.

10. The method of claim 6, further comprising:
receiving a request to display a subset of the participants in the community network; and
displaying the requested subset of community network participants in response to receiving the request to display the subset of the participants.

11. The method of claim 10, wherein the requested subset of community network participants comprises only the participants with which a participant requesting the subset has had a predefined number of prior conversations.

12. A computer-readable medium having computer-executable instructions stored thereon which, when executed by a computer, cause the computer to:
receive a request to display a community network graph showing a subset of participants in a community network;
in response to receiving the request, display representations of the requested subset of participants on the community network graph with representations of relationships between the participants within the subset;
receive a request to zoom into a higher zoom level within the community network graph;
in response to receiving the request to zoom, fluidly zoom into the higher zoom level and display a community network attribute corresponding to each community network participant shown in the higher zoom level of the community network graph;
receive a request to initiate a conversation with a participant of the subset of participants in the community network;
in response to receiving the request, display a user interface for receiving an indication as to whether the conversation should be public or private, a topic for a public conversation, and an identity of at least one target conversation participant;
receive via the user interface an indication as to whether the conversation should be public or private;
receive via the user interface the topic of the public conversation;
receive via the user interface an identifier corresponding to the at least one target conversation participant; and
provide the public conversation request and corresponding public conversation topic to the at least one target conversation participant.

13. The computer-readable medium of claim 12, wherein the subset of participants in the community network comprises participants engaged in public conversations.

14. The computer-readable medium of claim 12, further comprising computer-executable instructions stored thereon which, when executed by the computer, cause the computer to dynamically update the representation of the community network attributes in real-time as the attributes change.

15. The computer-readable medium of claim 12, wherein the community network attribute corresponding to each community network participant shown in the higher zoom level of the community network graph comprises a participant identifier and an identification of other participants with which the participant is engaged in a conversation.

16. The computer-readable medium of claim 12, further comprising computer-executable instructions stored thereon which, when executed by the computer, cause the computer to dynamically update the representations of relationships between the participants within the subset to indicate when a conversation between a plurality of the participants commences.

17. A computer-implemented method for enabling traversal of a community network, the computer-implemented method comprising computer-implemented operations for:
   displaying a community network graph that includes representations of all of the participants in the community network and relationships between participants;
   receiving a request to zoom in to view a portion of the community network graph;
   in response to receiving the request, fluidly zooming into the requested portion of the community network graph and displaying a plurality of community network attributes corresponding to each community network participant shown in the requested portion of the community network graph;
   receiving a request to display a subset of the participants in the community network; and
   displaying the requested subset of community network participants in response to receiving the request to display the subset of the participants, wherein the requested subset of community network participants comprises only the participants with which a participant requesting the subset has had a predefined number of prior conversations.

* * * * *